US008960544B2

(12) United States Patent
Lazzerini

(10) Patent No.: US 8,960,544 B2
(45) Date of Patent: Feb. 24, 2015

(54) SENSOR FOR READING BANKNOTES, SECURITY PAPERS AND THE LIKE, CONTAINING AT LEAST ONE SECURITY ELEMENT

(75) Inventor: Maurizio Lazzerini, Cerro al Lambro (IT)

(73) Assignee: Fedrigoni S.p.A., Verona (IT)

( * ) Notice: Subject to any disclaimer, the term of this patent is extended or adjusted under 35 U.S.C. 154(b) by 672 days.

(21) Appl. No.: 12/918,178

(22) PCT Filed: Jun. 24, 2008

(86) PCT No.: PCT/EP2008/058025

§ 371 (c)(1), (2), (4) Date: Aug. 18, 2010

(87) PCT Pub. No.: WO2009/103352

PCT Pub. Date: Aug. 27, 2009

(65) Prior Publication Data

US 2010/0327061 A1 Dec. 30, 2010

(30) Foreign Application Priority Data

Feb. 19, 2008 (IT) .............................. MI2008A0261

(51) Int. Cl.
*G06K 7/08* (2006.01)
*G07D 7/04* (2006.01)

(52) U.S. Cl.
CPC ........................................ *G07D 7/04* (2013.01)
USPC ........................................... 235/449; 235/435

(58) Field of Classification Search
USPC .......................................... 235/449, 435, 450
See application file for complete search history.

(56) References Cited

U.S. PATENT DOCUMENTS

| | | | | |
|---|---|---|---|---|
| 5,096,038 | A * | 3/1992 | Potter et al. | 194/210 |
| 5,122,916 | A * | 6/1992 | Aranovsky | 360/123.01 |
| 5,196,681 | A * | 3/1993 | Mantegazza | 235/449 |
| 5,545,885 | A | 8/1996 | Jagielinski | |
| 6,513,713 | B1 * | 2/2003 | Aruga | 235/449 |
| 2004/0046023 | A1 | 3/2004 | Buttifant et al. | |
| 2006/0028772 | A1 * | 2/2006 | Raastad | 360/315 |
| 2006/0125176 | A1 | 6/2006 | Kato | |
| 2006/0186203 | A1 | 8/2006 | Buttifant et al. | |

FOREIGN PATENT DOCUMENTS

| | | |
|---|---|---|
| EP | 0 319 157 | 6/1989 |
| EP | 0 428 779 A1 | 5/1991 |
| EP | 0 516 790 | 7/1992 |
| EP | 1 221 679 A1 | 7/2002 |
| EP | 1 672 594 A1 | 6/2006 |

(Continued)

OTHER PUBLICATIONS

International Search Report dated Jan. 9, 2009.

(Continued)

*Primary Examiner* — Sonji Johnson
(74) *Attorney, Agent, or Firm* — Scully, Scott, Murphy & Presser, P.C.

(57) ABSTRACT

A reading sensor adapted to read a security element having magnetic areas with different coercivity, comprising at least one first reading head and at least one second reading head, which are arranged parallel to each other and are capable of detecting two distinct signal sequences, and a permanent magnet which is arranged between the reading heads.

12 Claims, 3 Drawing Sheets

(56) References Cited

FOREIGN PATENT DOCUMENTS

| | | | |
|---|---|---|---|
| RU | 2 142 130 | C1 | 11/1999 |
| WO | WO 2004/014665 | A1 | 2/2004 |
| WO | WO 2004/098900 | A2 | 11/2004 |
| WO | WO 96/36873 | | 11/2006 |

OTHER PUBLICATIONS

Office Action dated Mar. 16, 2012 received from the Russian Patent Office from related Russian Application No. 2010138568, together with an English-language translation.

* cited by examiner

SENSOR FOR READING BANKNOTES, SECURITY PAPERS AND THE LIKE, CONTAINING AT LEAST ONE SECURITY ELEMENT

TECHNICAL FIELD

The present invention relates to a sensor for reading banknotes, security papers and the like, containing at least one security element.

BACKGROUND ART

As is known, with the advancement of technology and the spread of devices for reproducing graphic elements printed or positioned on banknote paper, the need to have security elements which can be inserted at least partially in banknote paper has been, and still is, increasing. One of the elements that is constantly being developed and researched is the security thread that is normally inserted at least partially in banknote paper.

Through the years, the security thread has undergone a constant but significant advancement, so much that it is still one of the least counterfeited elements, since its counterfeiting is difficult even for expert counterfeiters.

Among security threads, it is possible to identify for example metallic threads with negative text, i.e., threads provided by a plastic backing on which at least one layer of metal is arranged in which characters, lettering and the like are formed by total removal of the metal at the regions of the characters and/or lettering.

EP 319 157 discloses this technique.

A thread is also known, for example, in which in order to increase the security characteristics, at least one layer of ink with fluorescent properties with a solid background is added and thus covers both the regions without metal and the metallic regions.

There are other types of thread in which discontinuities of the metal are inserted between blocks of letters so that conductivity can be detected in assured and known lengths.

However, the marketing of so-called "transfer" metallized stripes has allowed all these types of thread to be counterfeited significantly, leading to the need to provide a partially demetallized thread, which therefore leaves in the characters a small amount of metal which can be detected by suitable laboratory equipment.

Therefore, in this last type of thread, the characters are only partially demetallized. Patent applications PCT EP 02/111177 and PCT EP 04/004767 relate to so-called partially demetallized threads of the type described above.

There are also types of thread which can be detected also by means of magnetic sensors. EP 516 790 discloses a thread in which detectable magnetic regions are inserted between the letters provided by performing a total demetallization, so that the thread can thus be detected both as conductive (due to the presence of metal deposited in continuous form) and by way of magnetic sensors (by way of the magnetic elements arranged above or below the layer of metal but never inside the letters).

Therefore, EP 516 790 discloses a security device in which the characters or letters are totally demetallized.

Generally, coded magnetic threads are currently provided by depositing magnetic areas on a fully metallized polyester backing; such areas are composed with a single type of magnetic ink and are separated by spaces in which regions without metallic material, designed to generate texts, are generated. It is evident that once the presence of magnetic areas has been discovered, their coercivity and residual magnetism can be identified easily and accordingly the magnetic material to be used to create a counterfeit or forgery is also easily identifiable; a code thus provided generates the same signals, and therefore the same code, both when it is detected longitudinally (along the axis of the thread) and when it is detected transversely (reading at right angles to the thread).

Security threads with magnetic regions provided with a single type of magnetic ink also have been the subject of counterfeiting, again with the transfer method. It is in fact possible to provide a stripe which has negative characters by using metallic transfers onto which magnetic elements in continuous and discontinuous form are transferred at a later time between the blocks of letters in order to create magnetic codes. To provide industrially a thread of the type cited above it is sufficient to have a rotary printing machine with multiple printing sections as disclosed also in EP 516 790, printing on a transparent material (generally polyester) graphic markings with removable inks, metallizing in vacuum with a solid background so as to cover the removable inks, removing the inks and consequently also the metal that covers them, thus leaving graphic markings which are identical to the ones printed with removable inks, and subsequently printing with magnetic inks continuous or discontinuous areas in the regions that are not demetallized and are therefore adjacent to the demetallized regions.

In this manner, the presence of magnetic elements is not visible with normal viewing instruments (the naked eye, optical magnifiers, et cetera), since they are always covered by metal. The magnetic elements are visible exclusively with suitable devices dedicated to detecting magnetism, such as for example magnetic scanners or lenses with liquid magnetic ink inserted in vacuum.

Among sensors for reading security elements integrated in security papers, banknotes and the like, sensors such as those disclosed for example in EP 0428779 are known.

This patent in fact discloses a method which is based on identifying areas, separated by spaces, whose magnetic characteristics have a different coercivity, such as to generate two sequences of signals, which are generated by a first orientation magnet, by a first reading head, by a second orientation magnet for rotating the magnetism and by a subsequent second reading head with a further reorientation magnet. This reading method therefore provides for a plurality of elements arranged in succession.

However, the main drawback of such sensors is that they do not have the ability to "read" areas which are sufficiently close to each other and are therefore subject to the same degree of imperfect flatness, as occurs for example with used banknotes, which no longer have their original flatness in all their areas but can be creased and therefore no longer flat. Examining one another distant areas does not allow to have signals which can be compared to each other, since they originate from areas which differ at least in terms of flatness.

DISCLOSURE OF THE INVENTION

The aim of the present invention is to provide a sensor for reading banknotes, security papers and the like, which is capable of reading security elements which have magnetic areas with different coercivity.

Within this aim, an object of the present invention is to provide a reading sensor which is capable of reading banknotes, security papers and the like which incorporate said security elements, regardless of the direction of motion with which said banknotes, security papers and the like are moved toward the sensor.

Another object of the present invention is to provide a reading sensor which is capable of reading banknotes, security papers and the like with a feed rate from at least one banknote per second to at least 50 banknotes per second.

Another object of the present invention is to provide a sensor which allows to detect the different oxides that are present on the thread in a very confined physical space without the banknote that incorporates the thread exiting from the sensor.

Still another object of the present invention is to provide a reading sensor which is highly reliable, relatively simple to provide and at competitive costs.

This aim and these and other objects, which will become better apparent hereinafter, are achieved by a reading sensor which is suitable to read a security element which has magnetic areas with different coercivity, characterized in that it comprises at least one first reading head and at least one second reading head, which are arranged parallel to each other and are capable of detecting two distinct signal sequences, and a permanent magnet which is arranged between said reading heads.

BRIEF DESCRIPTION OF THE DRAWINGS

Further characteristics and advantages of the present invention will become better apparent from the detailed description of a preferred but not exclusive embodiment of the reading sensor according to the present invention, illustrated by way of non-limiting example in the accompanying drawings, wherein.

WAYS OF CARRYING OUT THE INVENTION

Figure 1:
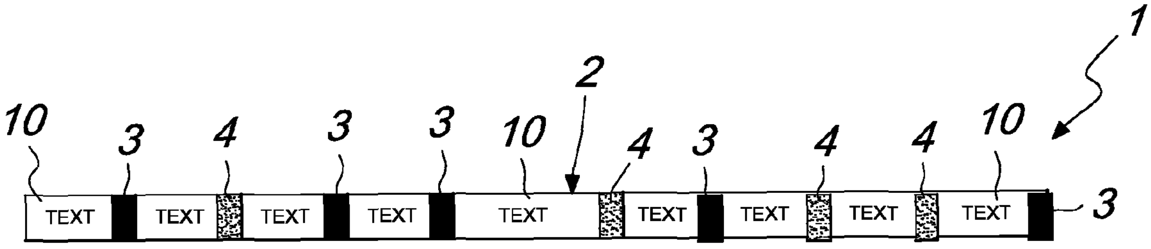
FIG. 1 is a plan view of a security element according to the present invention, in a first embodiment, with the optional second backing layer removed, suitable to be read by a sensor according to the present invention.

With reference to the figures, the security element according to the present invention, generally designated by the reference numeral 1, comprises a substrate or first backing layer 2, which is at least partially opaque when viewed in transmitted light and on which magnetic areas 3, 4 are deposited. The substrate 2 is conveniently made of plastic material, such as polyester, and its opacity is caused by the presence of deposits of metal, inks with dyes and/or pigments, color shifting materials or materials obtained from mixtures of said materials.

The magnetic areas 3, 4 comprise at least two types of magnetic areas which have mutually different values of coercivity and/or residual magnetism.

In particular, the magnetic areas are provided by means of magnetic inks whose coercivity is different (for example 200 oe for the lowest and 3000 oe for the highest) and whose residual magnetism can be identical or different depending on the type of coding, when they are deposited sequentially, adjacently or superimposed.

Assume that a sequence of six magnetic areas 3, 4, separated by 4 mm of interspace, with an identical residual magnetism but in which the first, third and fifth regions have a coercivity of 4500 oe while the second, fourth and sixth regions and have a coercivity of 300 oe, are printed on a thread which is 2 mm wide.

By orienting all the areas 3, 4 with a magnet with high coercive power (15,000 G) and by detecting them with a first reading head 21 of a sensor 20, six areas in sequence are obtained; a second magnet, having a low coercive power (2500 G) but sufficient to rotate through 90° the magnetism of the areas 4 with low coercive power and arranged within the same sensor 20, will allow a second reading head 22 to detect only the remaining magnetic areas, which are the ones with high coercive power.

Figure 2:
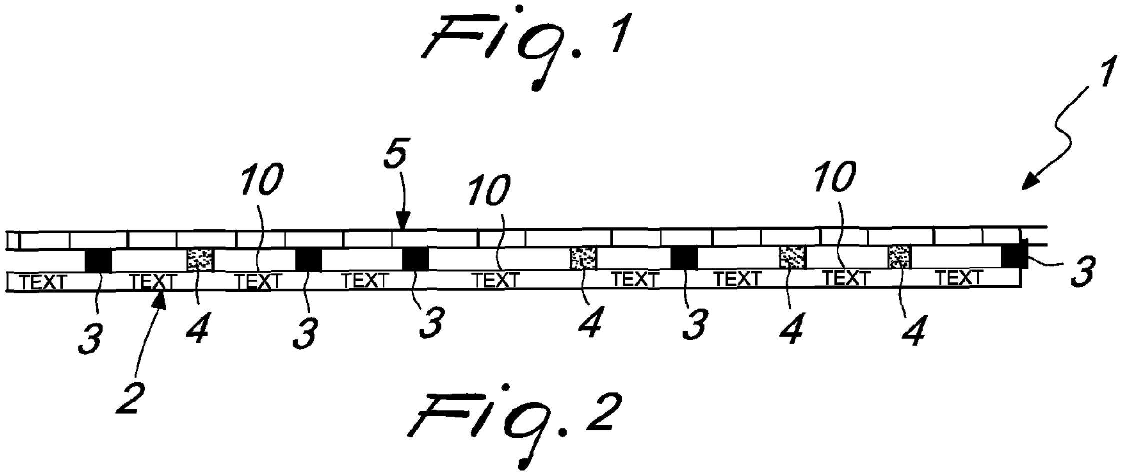
FIG. 2 is a sectional view of the security element of FIG. 1, with the second backing layer present.
Figure 3A:
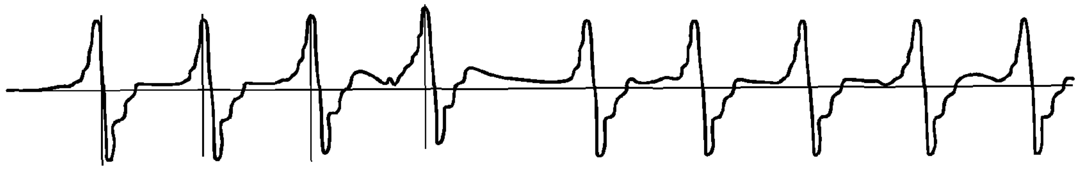
FIGS. 3*a*, 3*b* and 3*c* plot respective signals which can be obtained by reading the security element according to FIGS. 1 and 2 by using the sensor according to the present invention.
Figure 3B:
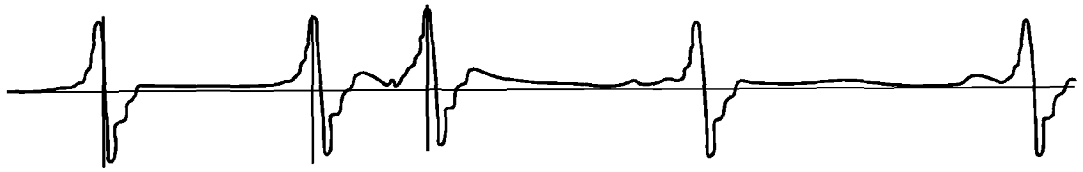
Figure 3C:
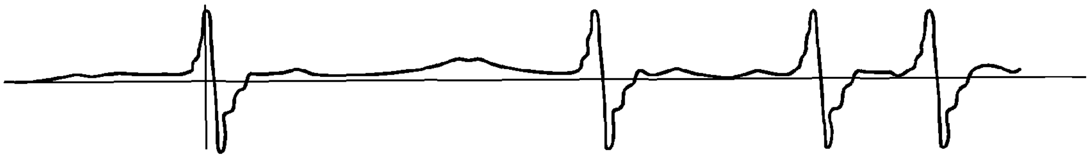
Figure 4:
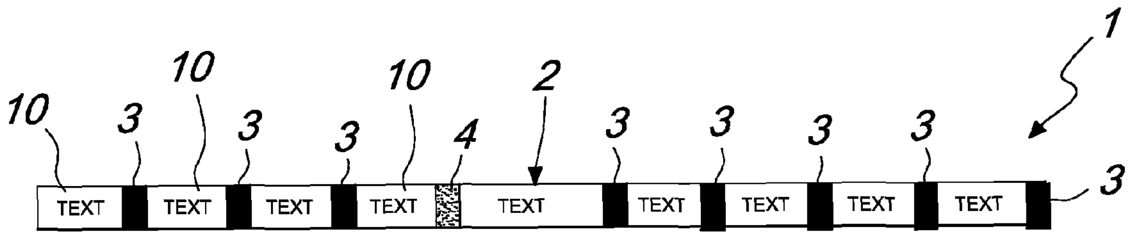
FIG. 4 is a plan view of a security element, in a second embodiment, with the optional second backing layer removed, readable by a sensor according to the present invention.

FIGS. 3*a*-3*c* plot respectively the signals that can be detected by a reading sensor for a security element 1 according to the first embodiment of FIGS. 1 and 2, in which FIG. 3*a* plots the signals that can be detected from all the magnetic areas 3, 4, FIG. 3*b* illustrates the signals that can be detected from the magnetic areas with high coercivity value, while FIG. 3*c* plots the signals that can be detected from the magnetic areas with low coercivity value.

Substantially, a security element, such as a security thread, has been provided which contains a first code generated by all the magnetic areas 3, 4 that are present (read by the first reading head 21), a second code generated only by the areas 3 with high coercive power (read by the second reading head 22) and a third code generated only by the areas with low coercive power 4 (the result of all the areas 3, 4 minus the ones with high coercive power 3). This is achieved for example by using the same value of residual magnetism both for the areas 4 with low coercive power and for the regions 3 with high coercive power.

Figure 5:
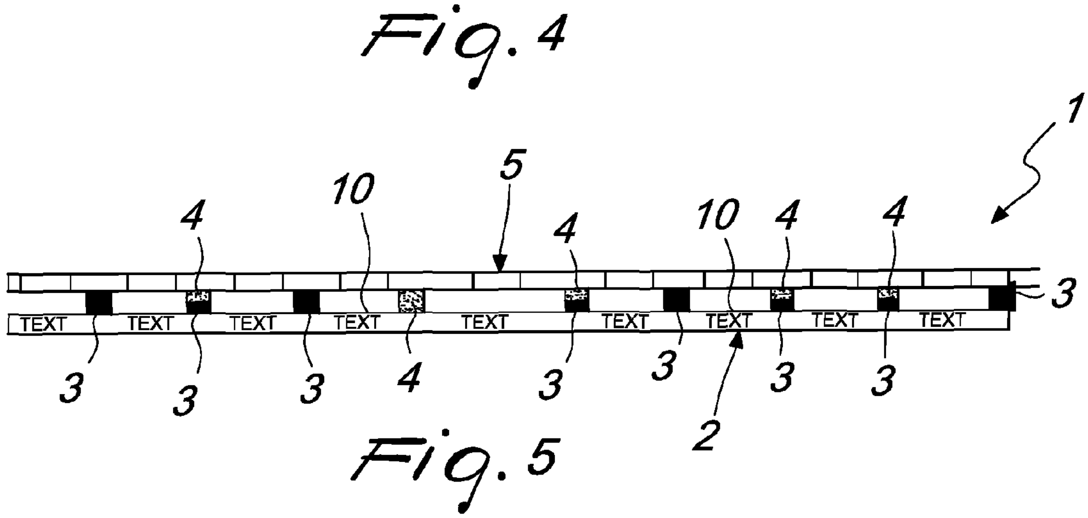
FIG. 5 is a sectional view of the security element of FIG. 4, with the second backing layer present.

To increase further the degree of non-counterfeitability of the security element according to the invention, it is possible to provide areas 3 with a high coercive power which are arranged so as to be at least partially superimposed on areas 4 with low coercive power (see FIG. 5), in which the sum of the residual magnetisms is equal to the residual magnetisms of the adjacent areas, both if they have a high coercive power and if they have a low coercive power.

This overlap can occur for example by overprinting or, better still, by coupling in register two backing layers 2, 5 in which the first one contains the areas 3 with high coercive power with a residual magnetism for example of 100 nW/m with other areas 3 with high coercive power with a residual magnetism for example of 50 nW/m and the second backing layer 5 contains areas 4 with low coercive power with a residual magnetism for example of 100 nW/m and 50 nW/m. If the two layers 2, 5 are coupled in register, superimposing the 50 nW/m areas, one obtains a sequence of areas whose signals, oriented with a magnet with high coercive power and read by the first reading head 21, are an identical sequence whose variation is caused only by the length of the areas.

By then rotating through 90° the magnetic flux of the areas with low coercive power 4, by using a magnet with less force, therefore for example 2500 G, one obtains a number of signals in sequence which is identical to those of the first head 21 but with an electrical signal which is 50% lower in the areas provided by superimposing inks or by coupling.

Another way to create areas that can generate different signals, when they are provided with oxides whose difference in coercivity allows the rotation of the magnetism of part of them, is to print them with a single ink which is a mixture of the two oxides.

Systems of this type allow a number of customizations which greatly increase the degree of non-counterfeitability in addition to allowing to check the banknote which incorporates the security thread both at low speed and at high speed.

Suppose that a security thread 2 mm wide is provided which has a first backing layer made of plastic material such as polyester 2, on which a solid background of aluminum 10 is deposited by vacuum metallization, text and/or graphic markings in said background being removed fully or partly according to preset graphics, considering the thickness of the aluminum, by means of a demetallization process.

Magnetic areas 3, 4, for example 2 mm long and separated by spaces 10 without magnetic material for a length of for example 4 mm, are then deposited between one text and the next. The magnetic areas 3 are provided by means of inks with high coercive power alternated with magnetic areas 4 with low coercive power; the residual magnetism of these areas is all identical, with a tolerance given by the different production processes.

This first backing layer 2 is then coupled to a further backing layer 5 made of polyester which is again metallized and demetallized, at least partially, in regions in order to leave free the areas where the text has been positioned in such a manner that they can be read in transmitted light.

New magnetic areas 3 are printed with a different surface in the regions of the second backing layer 5 that correspond to those where the magnetic areas 3, 4 have already been printed on the first backing layer 2:

one difference might be for example a 66% covering of the area, arranging the magnetic material on the edges of the thread.

Assuming that the width of the thread, which has been assumed to be for example 2 mm, is divided into three portions, one has a first area of 0.66 mm of magnetic material, a space of 0.66 mm and a second area of 0.66 mm of magnetic material. In this manner, the codes that are present on the thread, like all those described earlier, can be detected by means of suitable sensors described hereinafter.

This last type of thread therefore has a further characteristic, which consists in highlighting the presence of two additional areas only when the document is read transversely to the thread.

It is also evident that the second areas 3 printed onto the second polyester backing layer 5 can also be overprinted directly onto the first areas 4 that are already present on the first polyester backing layer 2.

It is also evident that the magnetic areas 3, 4 provided with different coercivities can have a residual magnetism which is identical and/or different and is determined both by the different quantity of magnetic material that is present for an equal area and thickness, or by the difference in thickness of the deposit for an equal area, or by oxides with equal coercivity but different residual magnetism (oxides of different physical origin) or between mixtures of all of the above.

Figure 6A:
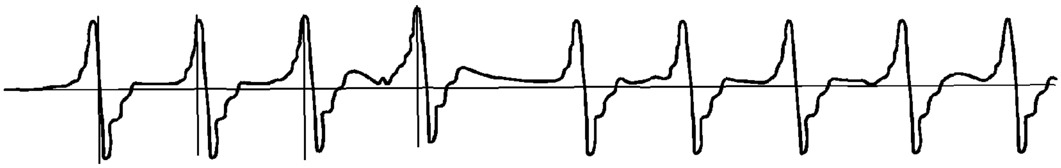
FIGS. 6*a*, 6*b* and 6*c* plot respective signals which can be obtained by reading the security element according to FIGS. 4 and 5 by using the sensor according to the present invention.
Figure 6B:
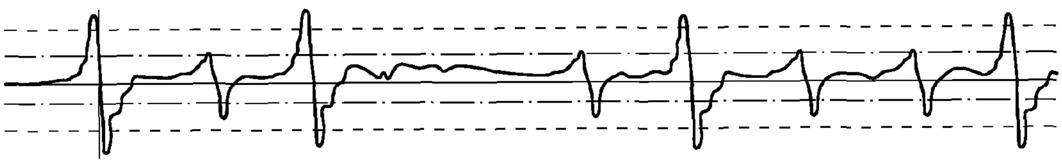
Figure 6C:
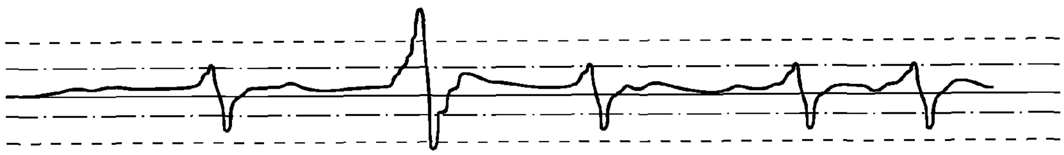

FIGS. 6*a*, 6*b*, 6*c* plot, in a manner similar to FIGS. 3*a*, 3*b* and 3*c*, the signals (codes) that can be detected from the security element provided according to the second embodiment of the invention.

All the threads described earlier provide for non-orientation of the magnetic direction of the magnetic ink during the transition from wet ink to dry ink which is characteristic of printing.

Further customizations can be performed for example by orienting the iron oxide used for the areas 3 and therefore with a high coercive power during the printing step when it is still wet, then overprinting or coupling in register the magnetic areas 4 with low coercive power. In this case, one has the magnetic areas 3 always oriented North-South, while the areas 4 can be oriented North-South or South-North (180° rotation of the magnetism) or can be cancelled by rotating the magnetism of the areas 4 through only 90°.

In order to detect the codes thus provided and formed on the security threads, it is convenient to use particular sensors which are innovative with respect to what is disclosed in EP 0428779.

The sensor 20 according to the present invention consists of a single enclosure which contains at least one first gap or reading head 21 (such head can be provided with one or more coils or windings which can be preferably both oriented in the same direction or in mutually opposite directions), a permanent magnet 23 (with the North-South magnetic flux arranged at right angles to the document), so long as its power is equal to, or lower than, for example 3800 gauss, and at least one second gap or reading head 22 which is exactly identical to the first one.

A sensor of this type can read banknotes in which the coded security thread is inserted, as described earlier, at a distance which varies between 0.2 mm and 2 mm; in order to further optimize reading, if one has read from 0.2 mm, the thickness of the read track of the first head can be 20 +/−3 microns, from a distance of 1 mm is 100 +/−5 microns, and from a distance of 2 mm it is 200 +/−5 microns.

Conveniently, the space between the first and second reading heads can be comprised between 4 mm and 8 mm, with a preferred value of 6 mm.

The angle at which the first and second reading heads are arranged with respect to the advancement direction of the security paper that incorporates the security thread with dual coercivity described above is comprised between 40° and 50°, with a preferred value of 45°.

Advantageously, the permanent magnet 23 has a width of at least 2 mm. In order to provide a multiple sensor with these characteristics, it is necessary to provide two packs of metal sheets (one for each gap) having a particular shape, in which each of the two packs can have wound thereon one or preferably two coils made of copper wire with a diameter of for example 0.03 mm and can insert between the two gaps a permanent magnet, for example a 3500 gauss magnet.

This allows to provide a multiple sensor whose dimensions, for equal reading characteristics with respect to those currently used, are as a whole reduced by 75%, so much that the measurements can reach a reading band of 60/70 mm with a width occupation of just 6 mm, of which 2 mm are of the permanent magnet.

Sensors of this type allow to use them in decoding apparatuses that are among the fastest currently commercially available (checking 40 banknotes per second) such as for example the BPS 2000 of the company Giesecke & Devrient, which currently uses magnetic sensors only to detect the presence of magnetic threads inside banknotes.

A multiple sensor such as the one described can be used equally on machines which treat the document for reading longitudinally to the thread, transversely to it, and in both reading directions.

Figure 7:
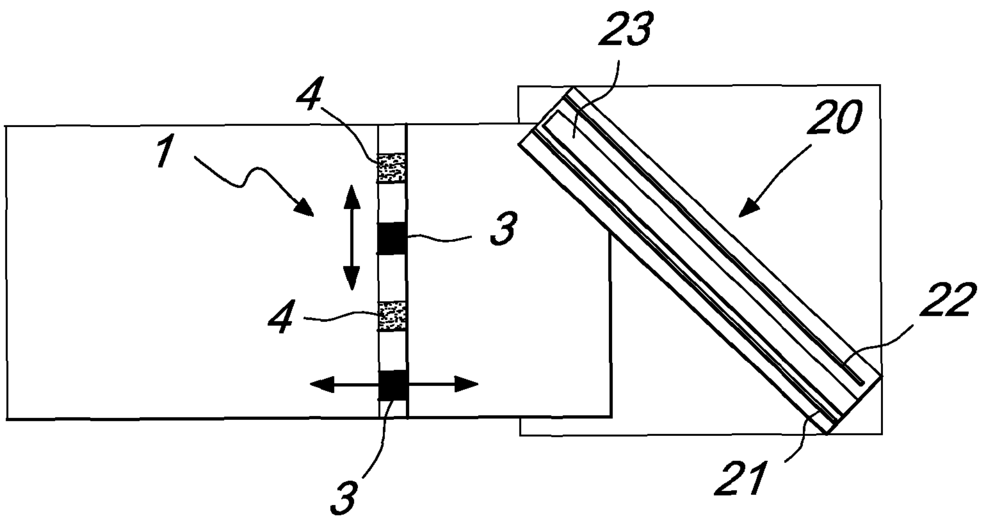
FIG. 7 is a view of a sensor for reading a security paper which incorporates a security element according to the present invention, with the sensor oriented at 45° with respect to the advancement direction of the security paper.

This goal is achieved by mounting the multiple sensor at a preferred angle of 45° (or in any case comprised between 40° and) 50°, so that the sequences of the areas that represent the codes appear in an identical manner both if the document arrives from above (sliding parallel to the thread, i.e., sliding downwardly or upwardly in the drawing of FIG. 7) and from the side (sliding at right angles to the thread, i.e., left to right or right to left in the drawing of FIG. 7).

A practical example is the fitting of the multiple sensor described above to the BPS 2000 apparatus, since the useful space for allocating the new sensor instead of the existing one is only 46.5 mm.

By using therefore a sensor which is for example 65 mm long and is inclined by 40-50° and preferably 45° (if one wishes to obtain the same reading for mutually perpendicular movements of the security element), it is possible to obtain a reading band of approximately 46 mm; this measurement is more than sufficient to detect security threads whose codes are contained in 40-mm bands.

If the codes are longer, a shape such as the one conceived allows to fit a plurality of sensors positioned vertically until the length of the code plus the necessary tolerance is reached (for example, for a code which is 70 mm long, two sensors will be fitted for a read area measuring 92 mm)

Moreover, the sensor according to the present invention can have a decoding rate comprised between 0.3 and 12 m/sec.

Conveniently, the reading heads 21 and 22 can have a signal preamplifier, and a filter for cleaning the signal whose reading frequency is suitable for simultaneous decoding of the security elements inserted therein.

The security elements thus provided, detected by the sensors as described and therefore the three codes that exist in a single banknote, can be used for example by different devices intended for different operators, such as ordinary shopkeepers with the first code, commercial banks with the first and second code, and central banks with all three codes.

It is noted that the security element that can be read by the sensor according to the present invention can be for example a security thread or a security stripe or can be positioned on a patch.

In some cases, this type of security element can also be printed onto a paper stripe to be inserted within the banknote or even on the paper of the banknote itself; in this case, the code system would be positioned and would therefore be always in the same position, further facilitating decoding.

Moreover, the security element that can be read by the sensor according to the invention can comprise, on at least one of its sides, holographic and/or color-shift and/or changing and/or mono or multi-fluorescent images.

Substantially, the sensor according to the invention allows the magnetic areas of the security thread described above, oriented conveniently in a North/South longitudinal direction, to appear below the first head of the sensor in order to be detected and then, those with lower coercivity, to be reoriented by the North/South magnet transversely, so that they appear under the second reading head to allow their subsequent detection.

This type of sensor has the peculiarity of allowing, in a minimum space, the sensing of both signals generated by the corresponding magnetic regions without the banknote, in which the thread is inserted, leaving said sensor.

If instead a sensor is used, as disclosed for example in EP 0428779, sensing is performed with a plurality of heads and magnets which are mounted in a plurality of enclosures, whose distance does not allow an accurate detection like the sensor according to the invention.

The banknotes that appear below the sensors are in fact both new banknotes, which are therefore perfectly flat, and used banknotes, which are therefore also slightly creased up. It is known that the magnetic signal detected at distances which differ even by a few hundredths of a millimeter can vary in its intensity and therefore, if the individual areas were provided by the overlap of inks with different coercivity, it would be very difficult to detect their variation in intensity.

Assume that a magnetic area with a length of 2 mm and a width of 1.8 mm (thread width) is printed, its thickness being 5 microns, the coercivity of the magnetic ink used being 270 oe. Over this area, another identical area with 3500 oe ink and again a thickness of 5 microns is printed in register. By magnetizing the assembly with a neodymium magnet>12,000 G, the electrical signal that could be derived from an area thus provided, by using a reading head arranged at a distance of 1 mm and at a speed of 10 m/s with an amplification of 400 might be approximately 5 V peak to peak.

By reorienting the same area with a 3800-G ferrite magnet whose N and S poles are arranged at 90° to the first one, one detects the signals generated only by the ink with high coercive power and therefore the 3500-oe ink. The power of the signal would however be reduced by approximately 50%.

As long as the examined banknotes have a completely flat surface, the difference remains within acceptable terms (50%+/−the manufacturing tolerance, which in general is a further 5%), but when the banknote to be examined has already circulated, its flatness is uneven and therefore might cause confusion in detecting the reduction of the signal.

The solution for detecting this difference in potential generated by the use of two types of oxide which are printed so as to be superimposed is therefore to ensure that signal analysis is performed in the smallest possible space, so that the difference in flatness is identical below the first and second read heads, thus using a sensor according to the present invention.

In practice it has been found that the sensor according to the present invention fully achieves the intended aim and objects.

The sensor thus conceived is susceptible of numerous modifications and variations, all of which are within the scope of the appended claims.

All the details may further be replaced with other technically equivalent elements.

In practice, the materials used, as well as the contingent dimensions and shapes, may be any according to requirements and to the state of the art.

The disclosures in Italian Patent Application no. MI2008A000261, from which this application claims priority, are incorporated herein by reference.

The invention claimed is:

1. A reading sensor configured to read a security element having magnetic areas with different coercivity, comprising:

at least one first reading head and at least one second reading head, which are arranged parallel to each other and are configured to detect two distinct signal sequences, and a permanent magnet which is arranged between said reading heads, wherein said first and second heads are arranged at an angle with respect to said security element, regardless of the direction of travel of said security element with respect to said sensor, wherein said reading heads comprises a signal preamplifier, and a signal cleaning filter whose reading frequency is suitable for simultaneous decoding of the security elements inserted in the reading heads.

2. The reading sensor according to claim 1, wherein said first and second reading heads are spaced in relation to one another so that said two distinct signal sequences refer to areas which are sufficiently close to each other to be affected by the same degree of imperfect flatness.

3. The reading sensor according to claim 1, wherein the distance between the two reading heads is comprised between 4 mm and 8 mm and the permanent magnet is at least 2 mm wide.

4. The reading sensor according to claim 1, wherein said first and second reading heads are arranged at an angle comprised between 40° and 50° with respect to said security element.

5. The reading sensor according to claim 1, wherein the reading sensor allows a decoding speed comprised between 0.3 and 12 m/s.

6. The reading sensor according to claim 5, wherein the first and second reading heads have a thickness comprised between 20 and 200 microns.

7. The reading sensor according to claim 1, wherein said reading heads are provided with two coils which are wound on themselves but with opposite winding directions.

8. The reading sensor according to claim 1, wherein said reading heads are provided by means of two coils which are wound on themselves with the same winding direction.

9. The reading sensor according to claim 1, wherein the reading sensor is configured to detect magnetic areas provided with different coercivity and equal residual magnetism, sending corresponding signals already selected according to coercivity.

10. The reading sensor according to claim 1, wherein the reading sensor is configured to detect magnetic areas provided with different coercivity and different residual magnetism, sending corresponding signals already selected according to coercivity.

11. The reading sensor according to claim 1, wherein the reading sensor detects magnetic areas provided with different coercivity and different residual magnetism generated by a difference in thickness of said areas, sending corresponding signals already selected according to coercivity.

12. The reading sensor according to claim 1, wherein the reading sensor detects magnetic areas provided with different coercivity and different residual magnetism generated by a mixture of oxides with different coercivity, sending corresponding signals already selected.

* * * * *